United States Patent [19]
Muenzer

[11] 3,766,907
[45] Oct. 23, 1973

[54] METHOD OF PREPARING ENDOMETRIAL SAMPLES

[75] Inventor: Robert W. Muenzer, Toledo, Ohio

[73] Assignee: Dow Corning Corporation, Midland, Mich.

[22] Filed: July 22, 1971

[21] Appl. No.: 165,224

[52] U.S. Cl.............. 128/2 B, 128/241, 128/278
[51] Int. Cl............................................. A61b 10/00
[58] Field of Search................ 128/2 B, 239, 240, 128/241, 276, 242, 245, 348–350; 27/24

[56] References Cited
UNITED STATES PATENTS

| 3,554,185 | 1/1971 | Kohl | 128/2 B |
|---|---|---|---|
| 2,482,622 | 9/1949 | Kahn | 128/348 |
| 3,385,300 | 5/1968 | Halter | 128/348 |
| 1,719,428 | 7/1929 | Friedman | 128/242 |
| 1,926,608 | 9/1933 | Ziegler | 128/239 |
| 2,826,197 | 3/1958 | Leonard | 128/245 |
| 3,527,203 | 9/1970 | Gravlee | 128/2 B |

Primary Examiner—William E. Kamm
Attorney—Robert F. Fleming, Jr. et al.

[57] ABSTRACT

There is disclosed herein an aspiration and method of using same for obtaining cell samples from the walls of a body cavity and designed particularly for obtaining samples from the lining of the uterus. The device comprises a tubular member, fenestrated at one end and adapted for connection to a hypodermic syringe at the other end and a tubular sleeve over the surface of the tubular member which is moved from a position near said adapter to a position covering the fenestrae on the end of the tube, whereby fluids pulled into the tubular member through the fenestrae can be ejected from the end of the tube for study.

1 Claim, 2 Drawing Figures

PATENTED OCT 23 1973

3,766,907

INVENTOR
ROBERT W. MUENZER

BY *Howard W. Hermann*
ATTORNEY

METHOD OF PREPARING ENDOMETRIAL SAMPLES

BACKGROUND OF THE INVENTION

The present invention relates to methods for obtaining cell samples from within living bodies and is particularly designed to obtaining endometrial samples for Papanicolaou screening (Pap smears), in detection of cervical and uterine cancer.

Various methods of obtaining such cell samplings have been devised and have shown encouraging results in the early detection, particularly of cervical carcinoma. These devices include, for example, endometrial brushes, endometrial washers, and scrapers and curettes of various shapes. While it is relatively easy to obtain samplings of the lining mucus of the vagina and mouth of the cervix, it has been at best difficult to obtain reliable samples from the uterus.

Endometrial carcinoma is a disease where the average age of the patient is considerably older than in the case of cervical carcinoma, and in many cases involves the post-menopausal woman. Under such conditions the cervical canal is not as patulous as in the younger menstruating woman. Any of the previous devices for obtaining uterine samples for cytologic studies have proven to be sufficiently large that painful dilation of the cervix is needed to pass the test instrument through the cervix and into the uterine cavity. Because of the pain involved in obtaining a specimen, patients are reluctant to accept routine yearly-type examination, which would likely result in earlier detection of the disease. Routine vaginal and cervical smears are unsatisfactory for use in detecting endometrial carcinoma due to the fact that the endometrium does not exfoliate as readily as the cervix or vagina. Accordingly, the number of cells reaching the vaginal pool for easy access is relatively small and the cells themselves frequently degenerate, whereby the whole sample is heavily diluted by material from the cervix and the vagina.

SUMMARY OF THE INVENTION

It is, therefore, an object of the present invention to provide a method for collecting cell samples from the endometrium, which avoids the aforementioned problems with the prior art and which is more likely to gain patients' acceptance for a routine regular type examination.

In accordance with these and further objects, there is provided by the present invention an aspiration device for collecting cell samples from the walls of body cavities comprising a first elongated open-ended tubular member adapted for insertion into the body cavity and having means for attachment to a source of vacuum and pressure at one end while being fenestrated at its other end so that samples are collected from a relatively large area as vacuum is applied to aspirate fluids into the device. Further, a second tubular sleeve member having an internal diameter approximating the external diameter of the first tubular member and a length at least as long as the fenestrated portion of the first member is slidably positioned on the first member and movable from a position distant from the fenestrated portion to a position covering the fenestrae whereby upon application of pressure to the first member, the fluid samples drawn into the member through the fenestrae can all be ejected from the end of the tube, for examination on a microscope slide, for example.

Additionally, a stylet may be positioned inside the first member for ease in insertion of the first member into the desired body cavity. The stylet is, of course, removed prior to aspiration of fluids into the device.

The first tubular member may be made of extremely fine tubing so that a minimum of dilation will be required for insertion of the fenestrated end of the tube into the uterus through the cervix. Similarly, the same type of device can be used to obtain samples from other body cavities.

BRIEF DESCRIPTION OF THE DRAWING

Other objects and advantages will become apparent from the following detailed description when read in conjunction with the accompanying drawing illustrating a preferred embodiment of this invention, in which.

DETAILED DESCRIPTION OF THE INVENTION

Figure 1:
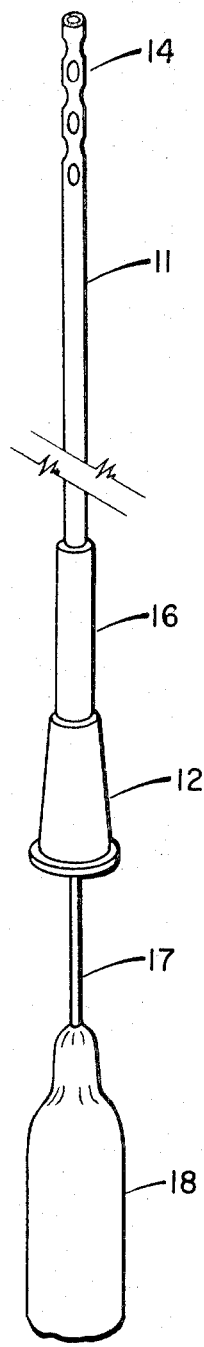
FIG. 1 is a view in perspective of an aspiration device made in accordance with the present invention showing the insertion stylet in place.
Figure 2:
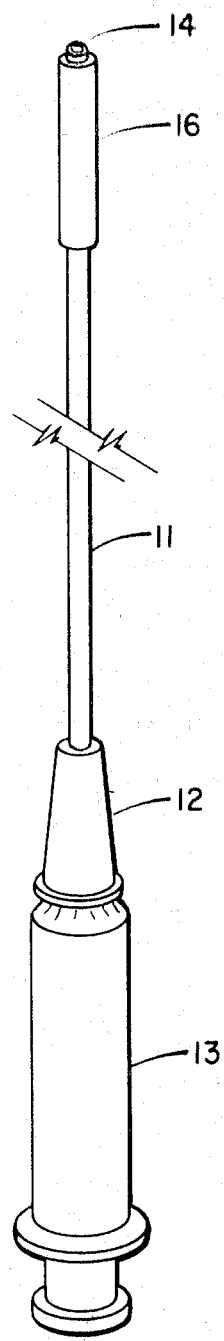
FIG. 2 is a view in perspective of the aspiration device of FIG. 1 showing the stylet removed, a hypodermic syringe in place for providing vacuum and pressure to the device, and the slidable sleeve positioned over the fenestrated end of the device.

Referring now to the drawings wherein corresponding parts are given like reference numerals throughout the figures thereof, there is shown in FIG. 1 a first elongated open-ended tubular member 11 which is desirably made of a silicone rubber, but which may be made of any other suitable material. Attached to the proximal end of the tubular member 11, is an attachment means 12 for attachment of the device to a suitable source of vacuum and pressure for aspiration of fluids into the tubular member 11 and ejection of the fluids therefrom. Such a suitable device is a hypodermic syringe 13 as may be seen in FIG. 2. The distal portion 14 of the tubular member 11 is fenestrated so that upon application of vacuum by withdrawal of the plunger of the syringe 13 fluids enter the bore of the tube 14 from a relatively wide area of contact. The fenestrae also provide insurance that even though some of the fenestrae may be plugged by debris an adequate sampling can still be obtained.

As shown in FIG. 1 there is positioned on the surface of the tubular member 11 a second tubular sleeve member 16 which has a length at least that of the fenestrated portion of the first member 11 and an internal diameter approximating the external diameter of the first member. The sleeve member 16 is selectively positionable from the position shown in FIG. 1 adjacent to the attachment adapter 12 to the position shown in FIG. 2, wherein the fenestrated portion of the first tubular member 11 is completely covered by the sleeve 16. In the position where the fenestrated portion of the tube is covered the relatively close approximation of diameters form a substantial seal of the fenestrae so that upon application of pressure by pushing the syringe plunger any fluids which have been collected are ejected from the distal end of the bore of the tubular member 11. Thus, all fluids can be concentrated easily in one area on a microscope slide for subsequent examination.

Particularly when the device is to be used for obtaining endometrial samples it is desirable that a stylet 17 having a handle 18 affixed thereto, is threaded through the tubular member 11 (FIG. 1) to stiffen the tubular member during insertion. The stylet 17 should have a length such that it does not protrude beyond the distal end of the tube 11. On the other hand, the stylet should come substantially to the very end of the tubular member 11, when it is wholly inserted, to prevent any easy bending of the distal portion of the tube 11.

In operation the stylet, if one is used, is inserted into the open end of the adapter 12, and the distal end of the tubular member 11 is inserted into the cervix. During insertion the tubular sleeve member 16 is kept in a position abutting or adjacent the adapter or attachment means 12. When the fenestrated portion 14 has been positioned in the uterus the stylet 17 is withdrawn from the device simply by pulling on the handle 18. The hypodermic syringe 13 or other source of vacuum is then affixed to the adapter 12 and a vacuum is drawn to draw fluids into the bore of the tube 11 through the fenestrae 14. The device is withdrawn from the uterus and cervix and the sleeve 16 is then positioned over the fenestrated portion 14 before applying pressure to the fluid by depression of the plunger of the hypodermic syringe to eject the fluid from the device.

In a particular embodiment of the device, the tubular member 11 consisted of a 7½ inch length of silicone rubber tubing having fenestrations over the distal 1¾ inches of the length. The tubing diameter was 0.085 inch external and 0.04 inch internal diameter.

It is understood that other variations and modifications of the invention will become apparent to those skilled in the art from a reading of the foregoing. It is therefore to be understood that within the scope of the appended claims the invention may be practiced otherwise than as specifically described.

That which is claimed is:

1. A method of preparing endometrial samples for microscopic examination comprising:

inserting through the cervix one end of a first elongated flexible tubular member having an ejector port at said end and having fenestrae through the tubular wall adjacent said (end) ejector port and having a second tubular member having an internal diameter approximating the external diameter of said first tubular member and being slidably coaxially mounted on said first member at a position spaced from the cervix, said second tubular member having a length at least that of the fenestrated portion of the first tubular member, and said first tubular member having a hypodermic syringe attached to the proximal end thereof;

withdrawing the plunger of said hypodermic syringe causing a vacuum in said first tubular member and sucking cell samples from the endometrium through said fenestrae, withdrawing said first tubular member from the cervix, sliding said second tubular member over the fenestrae of the first tubular member, placing the fenestrated end of the first tubular member over a microscope slide while the fenestrae are under the second tubular member, and pushing the plunger of said syringe to eject said cell samples onto said microscope slide from said ejector port.

* * * * *